B. F. McGRATH.
TICKET VENDING MACHINE.
APPLICATION FILED SEPT. 3, 1910.
992,024.
Patented May 9, 1911.
2 SHEETS—SHEET 1.
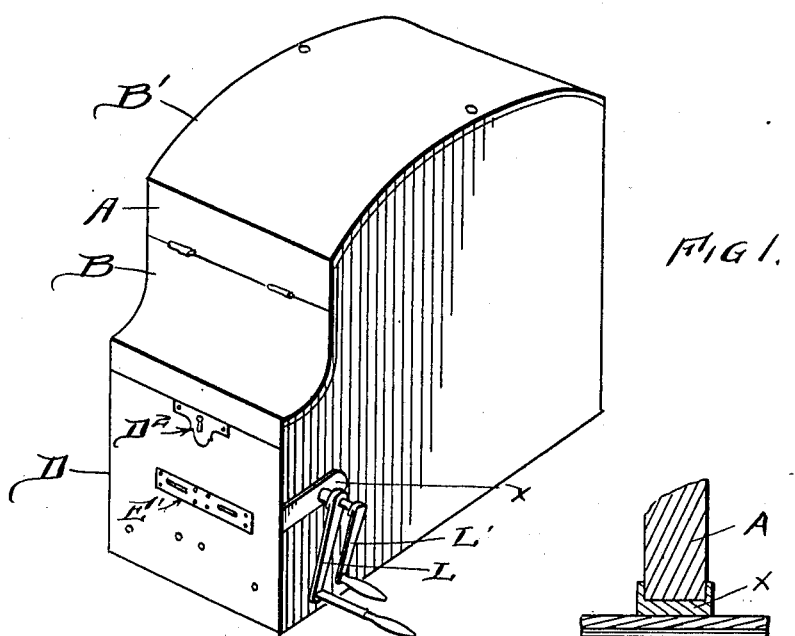
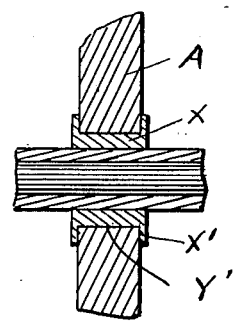
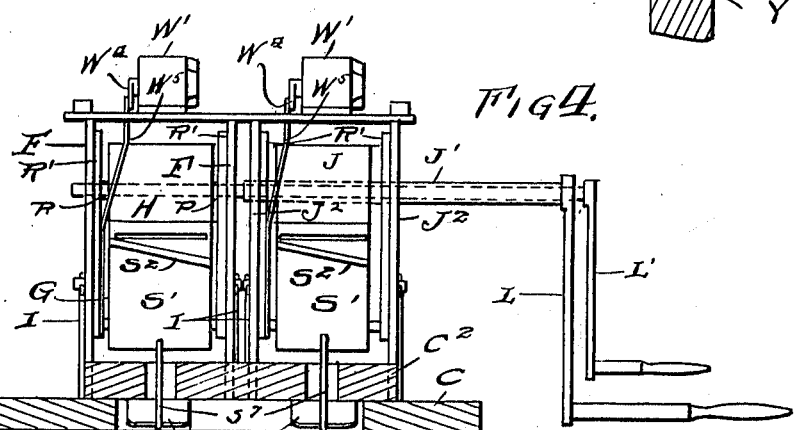

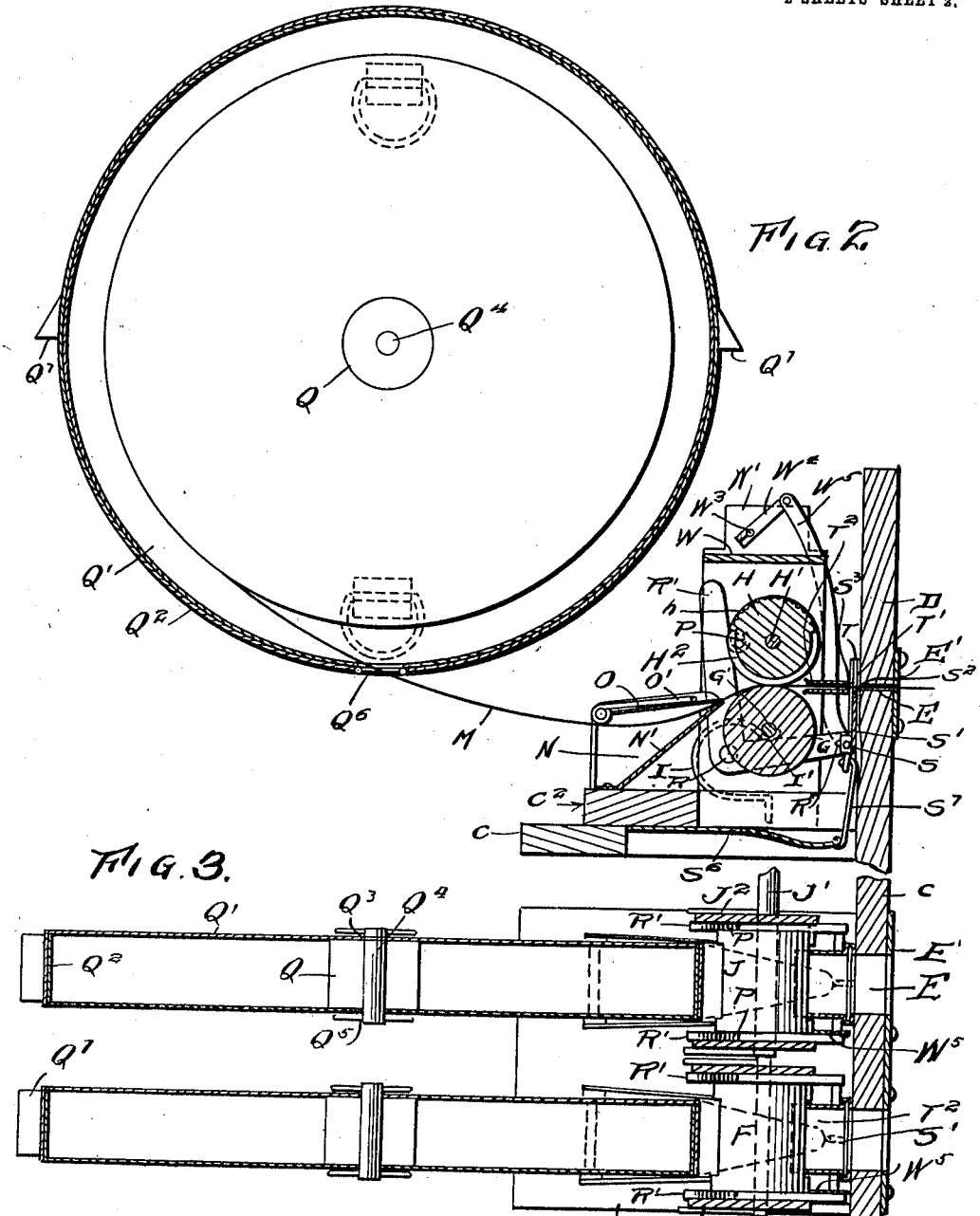

UNITED STATES PATENT OFFICE.

BENJAMIN F. McGRATH, OF McCONNELSVILLE, OHIO.

TICKET-VENDING MACHINE.

992,024.　　　　　Specification of Letters Patent.　　Patented May 9, 1911.

Application filed September 3, 1910. Serial No. 580,307.

*To all whom it may concern:*

Be it known that I, BENJAMIN F. MC-GRATH, a citizen of the United States, residing at McConnelsville, in the county of Morgan and State of Ohio, have invented certain new and useful Improvements in Ticket-Vending Machines; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for dispensing tickets and delivering the same singly and the object in view is to produce a simple and efficient device for the reels of film tickets in connection with places of amusement where tickets of admission are required.

More specifically the invention comprises a purality of sets of feeding rolls between which two strips of tickets may be fed, one set of reels being operated by a solid shaft contained within a hollow, while the other set is operated by a means connected to the hollow shaft.

The invention comprises various details of construction and combinations and arrangements of parts which will be hereinafter fully described and then specifically defined in the appended claims.

I illustrate my invention in the accompanying drawings, in which:—

Figure 1 is a perspective view showing the casing containing the operative parts of the apparatus and showing the two cranks for operating the hollow and solid shafts. Fig. 2 is an elevation of one of the reels containing the strip of tickets and the ends of two of the rollers between which the tickets are fed forward. Fig. 3 is a top plan view of the apparatus shown in Fig. 2 and illustrating in transverse section the two ticket reels, Fig. 4 is an enlarged front elevation showing the cutting knives in their correct relative positions, and Fig. 5 is a vertical sectional view through the casing and the removable plate carrying the operative parts of the apparatus.

Reference now being had to the details of the drawings by letter, A designates the casing of the apparatus which may be of any size or shape and is provided with a hinged closure B and a removable top B' whereby access may be had to the interior of the casing for any purpose. A removable plate, designated by letter C, is mounted within the casing and fixed to the forward edge of said plate is a removable front wall D and is provided with a lock $D^2$ adapted to receive the hasp $D^3$ which is secured to the under surface of the closure. Slots E are formed in said front wall of the casing and which slots are protected by the slot plate E'. Mounted upon said plate C is a block $C^2$ and securely fastened to the opposite edges of the latter are the upright plates F in which the spindles G' of the roller G are mounted, said spindles having a slight play in apertures formed in the plates F. Fixed to said plate C are the curved springs I which are bowed and each end bent to form a hook I' adapted to receive a spindle end of the roller G, the purpose of said springs being to normally hold the roller G to its farthest upper limit but allowing the same to yield for a purpose which will be presently described.

Journaled immediately above the roller G is a second roller H which is fixed to a solid shaft H' journaled in the upright plates and said roller H has frictional contact with the roller G, being held thereagainst by means of the springs I. A portion of the circumference of the roller H is recessed away as at $H^2$ to provide means whereby the ticket, after having been fed forward, may remain at rest while it is severed from the ticket strip, and the circumference of the roller intermediate the ends of the recess is fluted as at $h$ in order to frictionally grip and hold the ticket as it is being fed between the rollers.

Upon reference to the drawings, it will be noted that there are two sets of rollers mounted in similar upright plates, the two lower rollers being mounted identically in the same manner but the roller J in each set is fixed to a hollow shaft J' which is journaled in apertures in the plates $J^2$ and through which hollow shaft the solid shaft H' passes and has a bearing. An operating crank, designated by letter L, is fixed to the hollow shaft and a smaller crank handle L' is fixed to the projecting end of the solid shaft, forming means whereby either shaft may be turned one independent of the other.

Mounted upon the block $C^2$, one adjacent to the lower roller, are the conductor boxes N having their inner walls N' inclined and each provided with a hinged top O which is held in its normal position by means of a spring O'. When each hinged top O is in its normal position, it is positioned in the manner shown in the end elevation and between the side walls of the box and the strip of tickets M is of such a width as to be guided by the side walls of the boxing and to be fed out of the boxing and the upper inclined end wall and between the marginal edge thereof and the spring-actuated top, the latter yielding as the ticket is drawn by friction between the roller. The ticket strip is adapted to be contained upon the reel Q, having a casing made up of two disks Q', each having a circumferential flange $Q^2$ which telescope one within the other, the reel having a central opening $Q^3$ mounted upon the stub shaft $Q^4$ which is fixed to one of the disks. Suitable handles $Q^5$ are fastened to each disk, forming means whereby the two disks may be separated when it is desired to place a new strip of tickets upon the reel. Each of the flanges of the two disks is recessed as at $Q^6$, forming an opening through which the ticket strip passes, and lugs $Q^7$ project from the outer flange of the two disks at points diametrically opposite and are adapted to and forming means for supporting the disks.

Projecting from each end of each upper roller is a pin P and pivotally mounted upon pins R upon the upright plates F and $J^2$ are the angle levers R' which are tilted upon their pivots each time a pin P comes in contact with one arm of said lever, and each end of each angle lever is forked as at $R^2$ to receive the ends of a rod S which is fastened to a vertically movable cutting knife S' having an inclined cutting edge $S^2$ formed along the marginal edges of the slot $S^3$, the marginal edges of each knife being guided in a slot T formed in a plate T' fastened to the rear face of the removable front wall. Springs, designated by letter $S^6$, are fastened to the under surface of the plate $C^2$ and one end is fastened to a link $S^7$ which in turn is connected to the lower end of the knife and provided for the purpose of returning the latter to its normal position after having been raised by the tilting of the lever R' in the act of severing a ticket. Projecting from said plate T' toward each cylinder are the guide wings $T^2$, the ends of which flare outwardly and are so positioned as to guide the ticket as it is fed forward by the frictional contact with the rollers through the registering slots in the front wall and the plates attached thereto.

Mounted upon the plate W which is fastened to the upright plates F and $J^2$ are the adding devices contained within the boxings W', one for each pair of rollers, said adding devices being of any well known construction but which form no part of the present invention. Suffice it to say that one of the rollers $W^2$ of each adding mechanism has a spindle $W^3$ projecting from the boxing and to which a crank arm $W^4$ is fixed which in turn is pivotally connected to a link $W^5$ movable through a slot in the plate W and its lower end apertured for the reception of the rod S with which it has pivotal connection and so arranged that each time the apertured end of one of the levers R' tilts upon its pivot said link $W^5$ will be raised and the shaft $W^3$ rocked for the purpose of imparting an intermittent movement to the adding mechanism, thus registering each time a ticket is fed forward and severed.

Projecting from the inner face of the removable front wall is a plate X having an aperture through which the hollow shaft passes and having flanges X' projecting from its opposite edges and end, and which flanges engage the outer and inner faces of the side of the casing adjacent to the slot Y', when the parts are adjusted in the positions shown in Fig. 1 of the drawings. Said flanges serve to guide the front wall when it is pushed within or drawn from the casing.

The operation of my invention will be readily understood and is as follows:—The strips of tickets, being arranged upon the reels and fed between the rollers, will be guided by the conductor boxes and springs in line with the slots in the removable front wall and as they are fed between the rollers. As the rollers frictionally contact with each other in pairs, the fluted portions of one roller will securely grip the ticket strip and cause the same to be fed forward through the slots in the front wall of the casing, the spring-actuated tops of the conductor boxes yielding to allow the ticket to pass through and securely holding the same from recoiling and, as the rollers release the ticket to be cut, the spring plates securely hold the tickets. As the tickets are fed forward through the rollers, they are guided between the wings $T^2$ and, when the ticket has been fed forward a sufficient distance and comes to rest by reason of the recessed portion of the roller moving adjacent to the ticket, one or the other of the pins P, accordingly as one set of rollers or the other is rotated, will contact with an angle lever R' and cause the latter to tilt and move the cutting knife upward which will cause a draw cut across the ticket and sever the same from the strip, the spring $S^6$ serving to return the knife to its normal position. Simultaneously with the severing of the ticket, the links $W^5$ will be actuated longitudinally for the purpose of rocking the shaft $W^3$ to actuate the recording mechanism.

By the provision of an apparatus as shown and described, it will be noted that a simple and efficient mechanism is afforded whereby two reels of ticket strips may be fed forward by imparting a revolution to one or the other of the operating crank handles and severed and recording each ticket that is cut, thus dispensing with the necessity of applying serial numbers to the tickets in order to keep track of the number of tickets dispensed. By the construction shown, access may be readily had to any part of the apparatus when desired.

What I claim to be new is:—

1. A ticket vending apparatus comprising a casing having a slotted side wall, a removable front wall with a flanged projection at right angles thereto, adapted to engage said slot, the flanges of the projection designed to guide the front wall as it is adjusted in place or removed therefrom, ticket feeding mechanism movable with said front wall, and means for guiding the strip, and mechanism for severing the tickets, as set forth.

2. A ticket vending apparatus, comprising a casing having a slotted side wall, a removable front wall with a flanged projection designed to be guided in said slot, said projection being apertured, a shaft having a bearing in the aperture of the extension, a ticket carrying reel actuated by said shaft, and means for feeding a ticket strip from the reel and means for severing the strip as it is delivered, as set forth.

In testimony whereof I hereunto affix my signature in the presence of two witnesses.

BENJAMIN F. McGRATH.

Witnesses:
WILLARD MOORE,
E. M. KENNEDY.

---

Copies of this patent may be obtained for five cents each, by addressing the "Commissioner of Patents, Washington, D. C."